United States Patent
Miki

(10) Patent No.: US 11,196,050 B2
(45) Date of Patent: Dec. 7, 2021

(54) CATHODE ACTIVE MATERIAL AND FLUORIDE ION BATTERY

(71) Applicant: TOYOTA JIDOSHA KABUSHIKI KAISHA, Toyota (JP)

(72) Inventor: Hidenori Miki, Hiratsuka (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 82 days.

(21) Appl. No.: 16/175,123

(22) Filed: Oct. 30, 2018

(65) Prior Publication Data

US 2019/0140279 A1 May 9, 2019

(30) Foreign Application Priority Data

Nov. 7, 2017 (JP) .............................. JP2017-214725

(51) Int. Cl.
*H01M 4/58* (2010.01)
*H01M 10/05* (2010.01)
*H01M 10/054* (2010.01)
*H01M 4/02* (2006.01)

(52) U.S. Cl.
CPC ........... *H01M 4/582* (2013.01); *H01M 10/05* (2013.01); *H01M 10/054* (2013.01); *H01M 2004/028* (2013.01)

(58) Field of Classification Search
USPC ....................................................... 429/221
See application file for complete search history.

(56) References Cited

U.S. PATENT DOCUMENTS

| | | | |
|---|---|---|---|
| 4,341,612 A * | 7/1982 | Oda | C25B 1/46 204/253 |
| 4,399,204 A * | 8/1983 | Clark | H01M 4/582 429/225 |
| 4,519,954 A * | 5/1985 | Burrington | B01J 31/2404 558/363 |
| 5,320,917 A * | 6/1994 | Takada | C01G 25/006 423/464 |
| 6,608,152 B2 * | 8/2003 | Ford | C08F 210/16 526/138 |

(Continued)

FOREIGN PATENT DOCUMENTS

| JP | 2008-537312 A | 9/2008 |
|---|---|---|
| JP | 2012005027 A * | 1/2012 |

(Continued)

OTHER PUBLICATIONS

Buchinskaya, P P. Fedorov. 'Lead difluoride and related systems', 2004 Russian Academy of Sciences and Turpion Ltd. Russian Chemical Reviews 73 (4) 371-400 (2004) (Year: 2004).*

(Continued)

*Primary Examiner* — Milton I Cano
*Assistant Examiner* — Suphia Quraishi
(74) *Attorney, Agent, or Firm* — Sughrue Mion, PLLC

(57) ABSTRACT

A main object of the present disclosure is to provide a novel cathode active material that can be used in a fluoride ion battery. The present disclosure achieves the object by providing a cathode active material used in a fluoride ion battery, the cathode active material comprising: a composition represented by $Pb_2MF_6$, in which M is at least one of Mn, Fe, Co, and Ni.

6 Claims, 7 Drawing Sheets

(56) References Cited

U.S. PATENT DOCUMENTS

| | | | | |
|---|---|---|---|---|
| 7,041,239 | B2* | 5/2006 | Barker | H01M 4/582 252/521.5 |
| 8,968,921 | B2* | 3/2015 | Yazami | H01M 10/0568 429/188 |
| 9,331,360 | B2* | 5/2016 | Weiss | H01M 4/36 |
| 9,490,475 | B2* | 11/2016 | O'Neill | H01M 4/624 |
| 10,727,533 | B2* | 7/2020 | Miki | H01M 4/661 |
| 10,790,539 | B2* | 9/2020 | Miki | H01M 4/136 |
| 2007/0141468 | A1* | 6/2007 | Barker | H01M 4/525 429/231.1 |
| 2008/0102373 | A1 | 5/2008 | Potanin | |
| 2008/0261113 | A1* | 10/2008 | Huang | H01M 4/485 429/221 |
| 2010/0021800 | A1* | 1/2010 | Yazami | H01M 10/056 429/50 |
| 2010/0035155 | A1* | 2/2010 | Okada | C01G 1/06 429/221 |
| 2010/0086853 | A1* | 4/2010 | Venkatachalam | C01G 45/1228 429/223 |
| 2010/0266899 | A1* | 10/2010 | Barker | H01M 4/13 429/221 |
| 2011/0236751 | A1* | 9/2011 | Amiruddin | H01M 4/0447 429/188 |
| 2011/0262816 | A1* | 10/2011 | Amatucci | H01M 4/70 429/336 |
| 2012/0164541 | A1* | 6/2012 | Darolles | H01M 6/164 429/326 |
| 2013/0084474 | A1* | 4/2013 | Mills | H01M 10/399 429/9 |
| 2013/0266644 | A1* | 10/2013 | Fromm | C12Q 1/04 424/451 |
| 2014/0072836 | A1* | 3/2014 | Mills | H01M 4/94 429/8 |
| 2015/0155546 | A1* | 6/2015 | Yushin | H01M 4/1397 427/78 |
| 2015/0171455 | A1* | 6/2015 | Mills | H01M 8/00 429/422 |
| 2015/0325883 | A1* | 11/2015 | Matsui | H01M 10/0569 429/339 |
| 2016/0043439 | A1* | 2/2016 | Nakamoto | H01M 10/0567 429/340 |
| 2016/0276659 | A1* | 9/2016 | Choi | H01M 4/525 |
| 2016/0336598 | A1* | 11/2016 | Yazami | H01M 4/622 |
| 2016/0372741 | A1* | 12/2016 | Chung | H01M 4/136 |
| 2017/0018768 | A1* | 1/2017 | Yushin | H01M 4/38 |
| 2017/0062805 | A1* | 3/2017 | Nakamoto | H01M 10/0568 |
| 2017/0098823 | A1* | 4/2017 | Yushin | H01M 4/628 |
| 2017/0170515 | A1* | 6/2017 | Yushin | H01M 10/052 |
| 2018/0175382 | A1* | 6/2018 | Chou | H01M 10/05 |
| 2018/0301764 | A1* | 10/2018 | Chou | H01M 10/36 |
| 2018/0351176 | A1 | 12/2018 | Miki | |
| 2019/0103607 | A1* | 4/2019 | Omichi | H01M 4/625 |
| 2019/0296352 | A1* | 9/2019 | Adachi | H01M 4/5835 |
| 2019/0363361 | A1* | 11/2019 | Asano | C04B 35/553 |

FOREIGN PATENT DOCUMENTS

| | | | | |
|---|---|---|---|---|
| JP | 5615497 | B2 | 10/2014 | |
| JP | 2017-010865 | A | 1/2017 | |
| JP | 2017010865 | A * | 1/2017 | |
| WO | WO-2006109930 | A1 * | 10/2006 | H01M 4/525 |
| WO | 2007/146453 | A2 | 12/2007 | |
| WO | WO-2007146453 | A2 * | 12/2007 | H01M 10/0568 |

OTHER PUBLICATIONS

Gschwind. F. 'Fluoride ion batteries: Theoretical performance, safety, toxicity, and a combinatorial screening of new electrodes', 2016, Journal of Fluorine Chemistry, 182 (2016), 76-90 (Year: 2016).*

M. Anji Reddy, et al., "Batteries based on fluoride shuttle", Journal of Materials Chemistry, 2011, pp. 17059-17062, vol. 21.

* cited by examiner

CATHODE ACTIVE MATERIAL AND FLUORIDE ION BATTERY

TECHNICAL FIELD

The present disclosure relates to a novel cathode active material that can be used in a fluoride ion battery.

BACKGROUND ART

As high-voltage and high-energy density batteries, for example, Li ion batteries are known. The Li ion battery is a cation-based battery utilizing Li ions as the carrier. Meanwhile, as anion-based batteries, fluoride ion batteries utilizing fluoride ions as the carrier are known.

For example, Patent Literature 1 exemplifies $CeF_x$ as a cathode active material in a fluoride ion battery. Also, Patent Literature 2 exemplifies various fluoride salts (such as CuF, $CuF_2$, $PbF_2$, and $PbF_4$) as a charged state cathode in a fluoride ion battery. Also, Patent Literature 3 exemplifies a metal fluoride represented by composition formula: $MF_x$ (provided that, in the formula, M is a metal, and X is the valence of the metal M) as a cathode active material in a fluoride ion battery. Also, Non-Patent Literature 1 exemplifies $CuF_2$, $BiF_3$, $SnF_2$, and $KBiF_4$ as a cathode active material in a fluoride ion battery.

CITATION LIST

Patent Literatures

Patent Literature 1: Japanese Patent (JP-B) No. 5615497
Patent Literature 2: Japanese Patent Application Publication (JP-A) No. 2008-537312
Patent Literature 3: JP-A No. 2017-010865

Non-Patent Literature

Non-Patent Literature 1: M. Anji Reddy et al., "Batteries based on fluoride shuttle", J. Mater. Chem., 2011, 21. 17059-17062

SUMMARY OF DISCLOSURE

Technical Problem

In order to improve performance of a fluoride ion battery, a novel cathode active material has been demanded. The present disclosure has been made in view of the above circumstances, and a main object thereof is to provide a novel cathode active material that can be used in a fluoride ion battery.

Solution to Problem

In order to achieve the object, the present disclosure provides a cathode active material used in a fluoride ion battery, the cathode active material comprising: a composition represented by $Pb_2MF_6$, in which M is at least one of Mn, Fe, Co, and Ni.

According to the present disclosure, it has been found out that a compound having a specific composition can be used as a cathode active material in a fluoride ion battery.

In the present disclosure, the M may comprise Mn.
In the present disclosure, the M may comprise Fe.
In the present disclosure, the M may comprise Co.
In the present disclosure, the M may comprise Ni.

Also, the present disclosure provides a cathode active material used in a fluoride ion battery, the cathode active material comprising: a Pb element, an M element, provided that M is at least one of Mn, Fe, Co, and Ni, and a F element; and a peak at a position of $2\theta=27.1°\pm1.0°$ and $31.3°\pm1.0°$ in an X-ray diffraction measurement using a $CuK\alpha$-ray.

According to the present disclosure, it has been found out that a compound having a specific crystal structure can be used as a cathode active material in a fluoride ion battery.

In the present disclosure, the M may comprise Mn.
In the present disclosure, the M may comprise Fe.
In the present disclosure, the M may comprise Co.
In the present disclosure, the M may comprise Ni.

Also, the present disclosure provides a fluoride ion battery comprising: a cathode active material layer, an anode active material layer, and an electrolyte layer formed between the cathode active material layer and the anode active material layer; wherein the cathode active material layer contains the above described cathode active material.

According to the present disclosure, usage of the above described cathode active material allows a fluoride ion battery to have excellent charge and discharge properties.

Advantageous Effects of Disclosure

The present disclosure exhibits effect of providing a novel cathode active material that can be used in a fluoride ion battery.

DESCRIPTION OF EMBODIMENTS

The cathode active material and the fluoride ion battery of the present disclosure are hereinafter explained in details.

A. Cathode Active Material

The cathode active material is a cathode active material used in a fluoride ion battery. The cathode active material usually comprises at least a Pb element, an M element (M is at least one of Mn, Fe, Co, and Ni), and a F element. Also, the cathode active material preferably comprises a composition represented by $Pb_2MF_6$ (M is at least one of Mn, Fe, Co and Ni). Also, the cathode active material preferably comprises a peak at the specific position in an X-ray diffraction measurement.

According to the present disclosure, it has been found out that the specific compound can be used as a cathode active material in a fluoride ion battery. The inventor of the present disclosure has had obtained the knowledge that it had been possible to use the compound containing at least a Pb element, a Cu element, and a F element as a cathode active material in a fluoride ion battery. The inventor of the present disclosure has conducted further researches based on the knowledge, and has found out that it has been possible to use a compound containing at least a Pb element, an M element (M is at least one of Mn, Fe, Co, and Ni), and a F element as a cathode active material in a fluoride ion battery.

The cathode active material preferably comprises a composition represented by $Pb_2MF_6$ (M is at least one of Mn, Fe, Co and Ni). The cathode active material comprises, for example, a composition represented by $Pb_2MnF_6$, may comprise a composition represented by $Pb_2FeF_6$, may comprise a composition represented by $Pb_2CoF_6$, and may comprise a composition represented by $Pb_2NiF_6$. Also, M may be two or more of Mn, Fe, Co, and Ni, and may be all of Mn, Fe, Co, and Ni. Incidentally, the cathode active material may contain an additional element to the extent the desired effect can be obtained.

Figure 7:
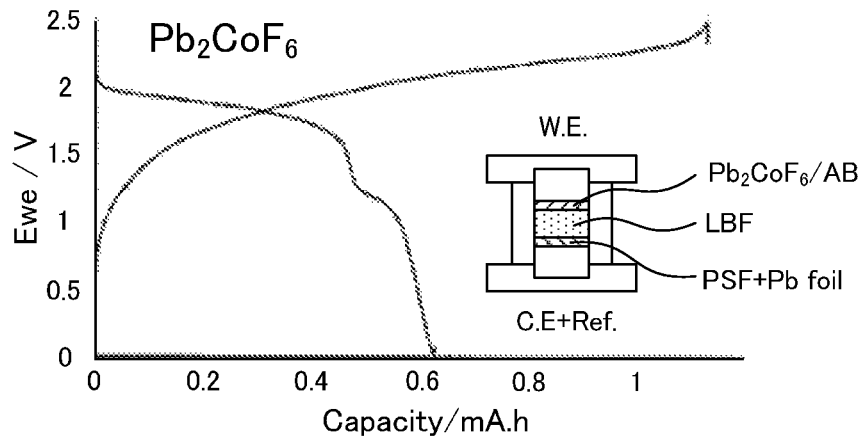
FIG. 7 is the result of a charge and discharge test for the evaluation battery obtained in Example 1.
Figure 8:
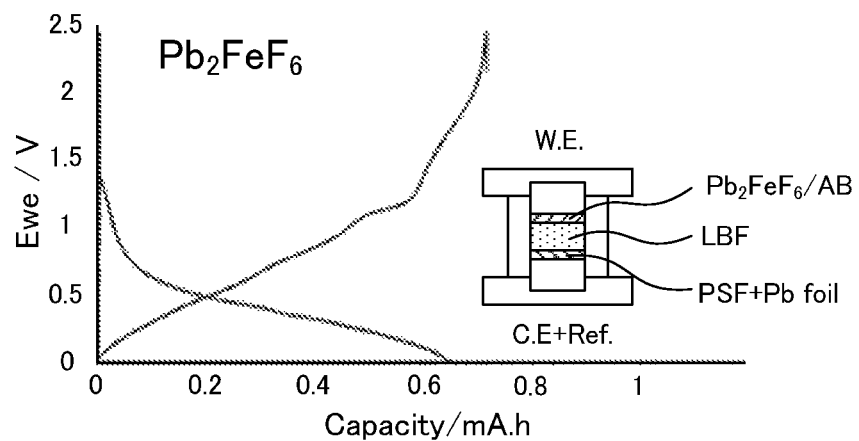
FIG. 8 is the result of a charge and discharge test for the evaluation battery obtained in Example 2.
Figure 9:
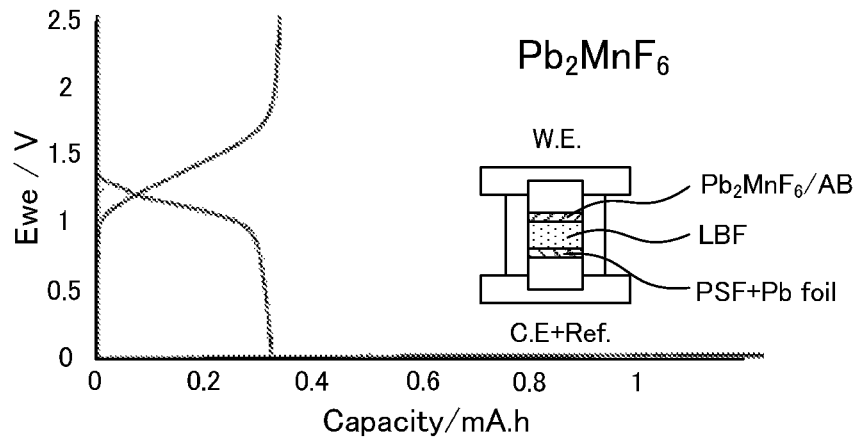
FIG. 9 is the result of a charge and discharge test for the evaluation battery obtained in Example 3.
Figure 10:
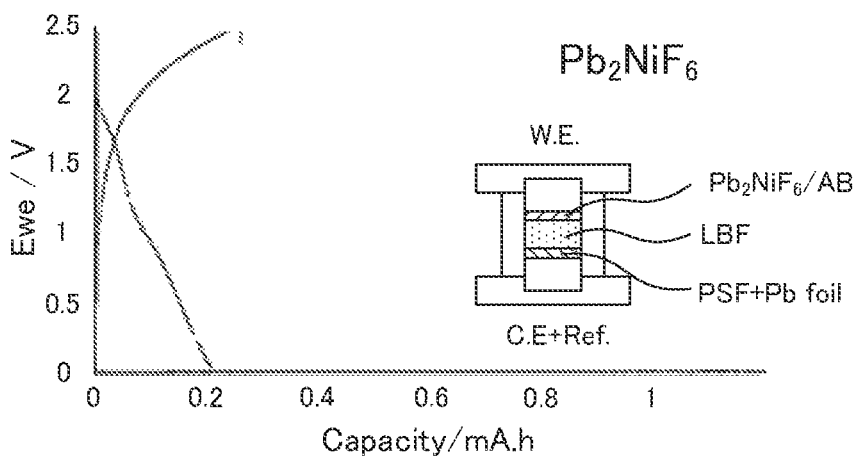
FIG. 10 is the result of a charge and discharge test for the evaluation battery obtained in Example 4.

According to the present disclosure, the cathode active material comprises the composition represented by $Pb_2CoF_6$ and thus charge and discharge especially at high potential is possible. Thereby, a fluoride ion battery with high voltage can be obtained. Details are as follows. The inventor of the present disclosure has found out that the fluorination and defluorination reactions have proceeded in the above compound utilizing an oxidation reduction reaction of a Co element becoming trivalence from bivalence, $Co^{2+} \leftrightarrow Co^{3+}$, when the compound has taken in a F element. It is considered that this phenomenon happens because the compound has the specific crystal structure. Also, the inventor of the present disclosure has achieved to remarkably improve the charge and discharge capacity derived from $Co^{2+} \leftrightarrow Co^{3+}$, by using the compound as a cathode active material. Further, since the compound utilizes the oxidation reduction reaction of $Co^{2+} \leftrightarrow Co^{3+}$ when taking in a F element, the charge reaction can proceed first. The inventor of the present disclosure has found out that charge and discharge at a high potential of approximately 2.0 V (vs. $Pb/PbF_2$) has been possible by proceeding the charge reaction first as shown in the result of the charge and discharge evaluation of Example 1 (FIG. 7) described later. This is considered to be because the standard electrode potential of $Co^{2+} \leftrightarrow Co^{3+}$ is 1.92 V which is comparatively high. Incidentally, as shown in the result of the charge and discharge evaluation of Comparative Examples 1 and 2 (FIGS. 11A to 11B and FIG. 12) described later, for example, the charge and discharge reaction cannot be confirmed with a material such as $CoF_2$ and $CoF_3$. The reason therefor has not been known, but one of the reasons therefor is considered to be because it is difficult to proceed the defluorination reaction and fluorination reaction from the viewpoint of the crystal structure of a material such as $CoF_2$ and $CoF_3$.

Also, according to the present disclosure, the cathode active material comprises the compound represented by $Pb_2FeF_6$ and thus a rate property remarkably improves as shown in the result of a rate characteristic evaluation in Example 2 described later (FIG. 13). In specific, high capacity maintenance rate can be obtained even when a current value is increased.

It is preferable that the cathode active material comprises a peak at a position of $2\theta=27.1°\pm1.0°$ in an X-ray diffraction measurement using a CuKα-ray. Incidentally, this peak range may be $\pm0.7°$ and may be $\pm0.5°$. Also, the cathode active material may comprise a peak in a range of $2\theta=26.1°$ or more and 28.1° or less, may comprise a peak in a range of $2\theta=26.3°$ or more and 27.9° or less, and may comprise a peak in a range of 26.6° or more and 27.6° or less in an X-ray diffraction measurement using a CuKα-ray.

It is preferable that the cathode active material comprises a peak at a position of $2\theta=31.3°\pm1.0°$ in an X-ray diffraction measurement using a CuKα-ray. Incidentally, this peak range may be $\pm0.7°$ and may be $\pm0.5°$. Also, the cathode active material may comprise a peak in a range of $2\theta=30.4°$ or more and 32.2° or less, may comprise a peak in a range of $2\theta=30.6°$ or more and 32.0° or less, and may comprise a peak in a range of 30.9° or more and 31.7° or less in an X-ray diffraction measurement using a CuKα-ray.

The cathode active material may comprise a peak at a position of $2\theta=45.1°\pm1.5°$ in an X-ray diffraction measurement using a CuKα-ray. Incidentally, this peak range may be $\pm1.0°$ and may be $\pm0.7°$. Also, the cathode active material may comprise a peak in a range of $2\theta=43.9°$ or more and 46.2° or less, may comprise a peak in a range of $2\theta=44.1°$ or more and 46.0° or less, and may comprise a peak in a range of 44.4° or more and 45.7° or less in an X-ray diffraction measurement using a CuKα-ray.

The cathode active material may comprise a peak at a position of $2\theta=53.5°\pm2.0°$ in an X-ray diffraction measurement using a CuKα-ray. Incidentally, this peak range may be $\pm1.5°$ and may be $\pm1.0°$. Also, the cathode active material may comprise a peak in a range of $2\theta=52.1°$ or more and 54.9° or less, may comprise a peak in a range of $2\theta=52.3°$ or more and 54.7° or less, and may comprise a peak in a range of 52.6° or more and 54.4° or less in an X-ray diffraction measurement using a CuKα-ray.

The cathode active material preferably contains a crystal phase including the above peak as a main phase. The proportion of the above crystal phase to all the crystal phases included in the cathode active material is, for example, 50 weight % or more, may be 70 weight % or more, and may be 90 weight % or more.

There are no particular limitations on the shape of the cathode active material, and examples thereof may include a granular shape. The average particle size ($D_{50}$) of the cathode active material is, for example, 0.1 μm or more, and may be 1 μm or more. Also, the average particle size ($D_{50}$) of the cathode active material is, for example, 50 μm or less, and may be 20 μm or less. The average particle size ($D_{50}$) of the cathode active material may be determined from, for example, the result of a particle distribution measurement by a laser diffraction scattering method.

There are no particular limitations on the method to produce the cathode active material as long as the method allows the intended cathode active material to be obtained, and examples thereof may include a mechanical milling method.

B. Fluoride Ion Battery

Figure 1:
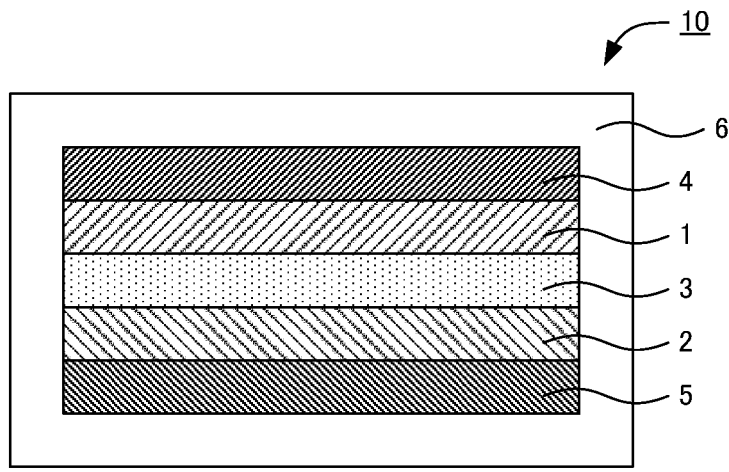
FIG. 1 is a schematic cross-sectional view illustrating an example of the fluoride ion battery of the present disclosure.

FIG. 1 is a schematic cross-sectional view illustrating an example of the fluoride ion battery of the present disclosure. Fluoride ion battery 10 illustrated in FIG. 1 comprises cathode active material layer 1 containing a cathode active material, anode active material layer 2 containing an anode active material, electrolyte layer 3 formed between cathode active material layer 1 and anode active material layer 2, cathode current collector 4 for collecting currents of cathode active material layer 1, anode current collector 5 for collecting currents of anode active material layer 2, and battery case 6 for storing these members. The present disclosure features a configuration that cathode active material layer 1 contains the cathode active material described in the section "A. Cathode active material" above.

The anode active material included in an anode slurry is a material usable in a secondary battery, and examples thereof may include a carbon material; specific examples of the carbon material may include a graphite material so called graphite. Specific examples thereof may include a natural graphite, an artificial graphite, a mixture of the natural graphite and the artificial graphite, and a natural graphite covered with the artificial graphite. There are no particular limitations on the shape of the anode active material, and examples thereof may include a ball shape. When the shape of the anode active material is the ball shape, the average particle size ($D_{50}$) of the anode active material is, for example, 1 nm or more, may be 10 nm or more, and may be 100 nm or more. Meanwhile, the average particle size ($D_{50}$) of the anode active material is, for example, 50 μm or less, and may be 20 μm or less.

According to the present disclosure, usage of the above described cathode active material allows a fluoride ion battery to have excellent charge and discharge properties.

The fluoride ion battery of the present disclosure is hereinafter explained in each constitution.

1. Cathode Active Material Layer

The cathode active material layer is a layer containing at least a cathode active material. The cathode active material may be in the same contents as those described in the section "A. Cathode active material" above; thus the descriptions herein are omitted. The content of the cathode active material in the cathode active material layer is, for example, 25 weight % or more, may be 50 weight % or more, and may be 75 weight % or more.

The cathode active material layer may further contain at least one of a conductive material and a binder, other than the cathode active material. The conductive material preferably has a desired electron conductivity, and examples thereof may include a carbon material. Examples of the carbon material may include carbon black such as acetylene black, Ketjen black, furnace black, and thermal black; graphene, fullerene, and carbon nanotube. The content of the conductive material in the cathode active material layer is, for example, 10 weight % or less, and may be 5 weight % or less.

The binder is preferably chemically and electronically stable, and examples thereof may include a fluorine-based binder such as polyvinylidene fluoride (PVDF) and polytetra fluoroethylene (PTFE). The content of the binder in the cathode active material layer is, for example, 10 weight % or less, and may be 5 weight % or less.

The cathode active material layer may and may not contain a solid electrolyte. In the latter case, it is preferable that the cathode active material layer contains the cathode active material and the conductive material. In the present disclosure, since the cathode active material has excellent fluorine conductivity, a function as the cathode active material layer can be exhibited if the conductive material bearing electron conductivity is included even when a solid electrolyte is not included in the cathode active material layer. Incidentally, for the purpose of avoiding problems such as a patent infringement, the specification "not including a solid electrolyte" includes a case of adding a very small amount of a solid electrolyte. For example, the case the proportion of the solid electrolyte in the cathode active material layer being 5 weight % or less also satisfies the condition of "not including a solid electrolyte".

The thickness of the cathode active material layer varies greatly with the constitutions of batteries.

2. Anode Active Material Layer

The anode active material layer is a layer containing at least an anode active material. Also, the anode active material layer may further contain at least one of a conductive material, a solid electrolyte, and a binder, other than the anode active material.

An arbitrary active material having a lower potential than that of the cathode active material may be selected as the anode active material. In the fluoride ion battery of the present disclosure, a charge reaction proceeds first. Accordingly, the anode active material before the initial charge contains a F element. Examples of the anode active material may include a fluoride of a simple substance of metal, an alloy, and metal oxide. Examples of the metal element to be included in the anode active material may include La, Ca, Al, Eu, Li, Si, Ge, Sn, In, V, Cd, Cr, Fe, Zn, Ga, Ti, Nb, Mn, Yb, Zr, Sm, Ce, Mg, and Pb. Among them, the anode active material is preferably $MgF_x$, $AlF_x$, $CeF_x$, $CaF_x$, and $PbF_x$. Incidentally, the x is a real number larger than 0.

As the conductive material and the binder, the same materials as those described in the section "1. Cathode active material layer" above may be used. The solid electrolyte may be in the same contents as those described in the section "3. Electrolyte layer" later; thus, the descriptions herein are omitted.

The content of the anode active material in the anode active material layer is preferably larger from the viewpoint of the capacity. For example, the content is 30 weight % or more, may be 50 weight % or more, and may be 70 weight % or more.

The thickness of the anode active material layer varies greatly with the constitutions of batteries.

3. Electrolyte Layer

The electrolyte layer is a layer formed between the cathode active material layer and the anode active material layer. The electrolyte configuring the electrolyte layer may be an electrolyte solution (a liquid electrolyte), and may be a solid electrolyte. In other words, the electrolyte layer may be a liquid electrolyte layer, and may be a solid electrolyte layer; however, the latter is preferable.

The liquid electrolyte contains a fluoride salt and an organic solvent for example. Examples of the fluoride salt may include an inorganic fluoride salt, an organic fluoride salt, and an ionic solution. An example of the inorganic fluoride salt may be XF (X is Li, Na, K, Rb, or Cs). An example of the cation of the organic fluoride salt may be an alkyl ammonium cation such as tetramethyl ammonium cation. The concentration of the fluoride salt in the liquid electrolyte is, for example, 0.1 mol % or more, and may be 1 mol % or more. Also, the concentration of the fluoride salt in the liquid electrolyte is, for example, 40 mol % or less, and may be 10 mol % or less.

The organic solvent of the liquid electrolyte is usually a solvent that dissolves the fluoride salt. Examples of the organic solvent may include glyme such as triethylene glycol dimethyl ether (G3) and tetraethylene glycol dimethyl ether (G4); a cyclic carbonate such as ethylene carbonate (EC), fluoroethylene carbonate (FEC), difluoroethylene carbonate (DFEC), propylene carbonate (PC), and butylene carbonate (BC); and a chain carbonate such as dimethyl carbonate (DMC), diethyl carbonate (DEC), and ethyl methyl carbonate (EMC). Also, an ionic solution may be used as the organic solvent.

On the other hand, examples of the solid electrolyte may include an inorganic solid electrolyte. Examples of the inorganic solid electrolyte may include a fluoride containing a lanthanoid element such as La and Ce, a fluoride containing an alkali element such as Li, Na, K, Rb, and Cs, and a fluoride containing an alkali earth element such as Ca, Sr, and Ba. Specific examples of the inorganic solid electrolyte may include a fluoride containing La and Ba, a fluoride containing Pb and Sn, and a fluoride containing Bi and Sn.

The thickness of the electrolyte layer varies greatly with the constitutions of batteries.

4. Other Constitutions

The fluoride ion battery of the present disclosure comprises at least the above described cathode active material layer, anode active material layer, and electrolyte layer, and usually further comprises a cathode current collector for collecting currents of the cathode active material layer, and an anode current collector for collecting currents of the anode active material layer. Examples of the shape of the current collectors may include a foil shape, a mesh shape, and a porous shape. Also, the fluoride ion battery may include a separator between the cathode active material layer and the anode active material layer. The reason therefor is to obtain a battery with higher safety.

5. Fluoride Ion Battery

The fluoride ion battery may be a primary battery and may be a secondary battery, but is preferably a secondary battery among them, so as to be repeatedly charged and discharged, and useful as a car-mounted battery for example. Incidentally, the secondary battery includes the usage of the secondary battery as a primary battery (for the purpose just to discharge once after charge). Also, examples of the shape of the fluoride ion battery may include a coin shape, a laminate shape, a cylindrical shape, and a square shape.

Incidentally, the present disclosure is not limited to the embodiments. The embodiments are exemplification, and any other variations are intended to be included in the technical scope of the present disclosure if they have substantially the same constitution as the technical idea described in the claim of the present disclosure and offer similar operation and effect thereto.

EXAMPLES

The present disclosure is hereinafter explained in further details with reference to Examples.

Example 1

Synthesis of Cathode Active Material $PbF_2$ and $CoF_2$ were weighed so as to be $PbF_2$: $CoF_2$=2:1 in the molar ratio, and mechanical milling thereto was conducted by a ball mill in the conditions of 600 rpm and for 3 hours to obtain a cathode active material ($Pb_2CoF_6$).

Fabrication of Evaluation Battery $PbF_2$ and $CoF_2$ weighed so as to be $PbF_2$: $CoF_2$=2:1 in the molar ratio ($PbF_2+CoF_2$), and acetylene black (AB) as a conductive material (electron conductor) in the weight ratio of ($PbF_2+CoF_2$):AB=95:5 were subjected to a mechanical milling using a ball mill in the conditions of 600 rpm and for 3 hours to obtain a cathode mixture. The obtained cathode mixture (working electrode), and a layered body (counter electrode) of a solid electrolyte layer ($La_{0.9}Ba_{0.1}F_{2.9}$ (hereinafter LBF)), a solid electrolyte ($Pb_{0.6}Sn_{0.4}F_2$ (hereinafter PSF)), and a Pb foil were pressure-powder-molded to obtain an evaluation battery.

Example 2

A cathode active material ($Pb_2FeF_6$) was obtained in the same manner as in Example 1 except that $CoF_2$ was replaced with $FeF_2$ for synthesizing the cathode active material. Also, an evaluation battery was obtained in the same manner as in Example 1 except that $CoF_2$ was replaced with $FeF_2$ for fabricating the evaluation battery.

Example 3

A cathode active material ($Pb_2MnF_6$) was obtained in the same manner as in Example 1 except that $CoF_2$ was replaced with $MnF_2$ for synthesizing the cathode active material. Also, an evaluation battery was obtained in the same manner as in Example 1 except that $CoF_2$ was replaced with $MnF_2$ for fabricating the evaluation battery.

Example 4

A cathode active material ($Pb_2NiF_6$) was obtained in the same manner as in Example 1 except that $CoF_2$ was replaced with $NiF_2$ for synthesizing the cathode active material. Also, an evaluation battery was obtained in the same manner as in Example 1 except that $CoF_2$ was replaced with $NiF_2$ for fabricating the evaluation battery.

Comparative Example 1

Fabrication of Evaluation Battery

A cathode active material ($CoF_2$), LBF as a solid electrolyte, and acetylene black (AB) as a conductive material (electron conductor) were mixed in the weight ratio of $CoF_2$:LBF:AB=30:60:10, and a mechanical milling thereto was conducted by a ball mill in the conditions of 100 rpm and for 10 hours to obtain a cathode mixture. The obtained cathode mixture (working electrode) and a layered body (counter electrode) of a solid electrolyte layer (LBF), a solid electrolyte (PSF), and a Pb foil were pressure-powder-molded to obtain an evaluation battery.

Comparative Example 2

An evaluation battery was obtained in the same manner as in Comparative Example 1 except that $CoF_3$ was used as the cathode active material.

[Evaluation]

XRD Measurement

Figure 2:
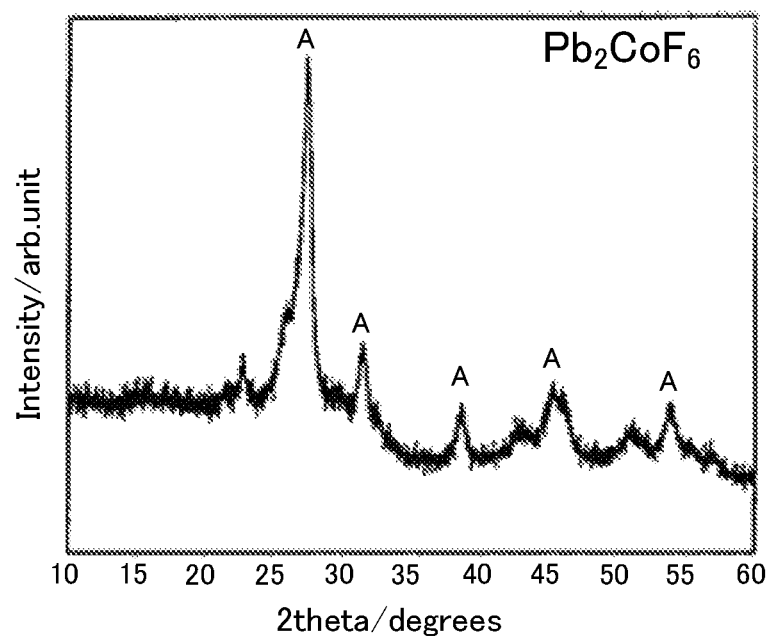
FIG. 2 is the result of an XRD measurement for the cathode active material ($Pb_2CoF_6$) used in Example 1.
Figure 3:
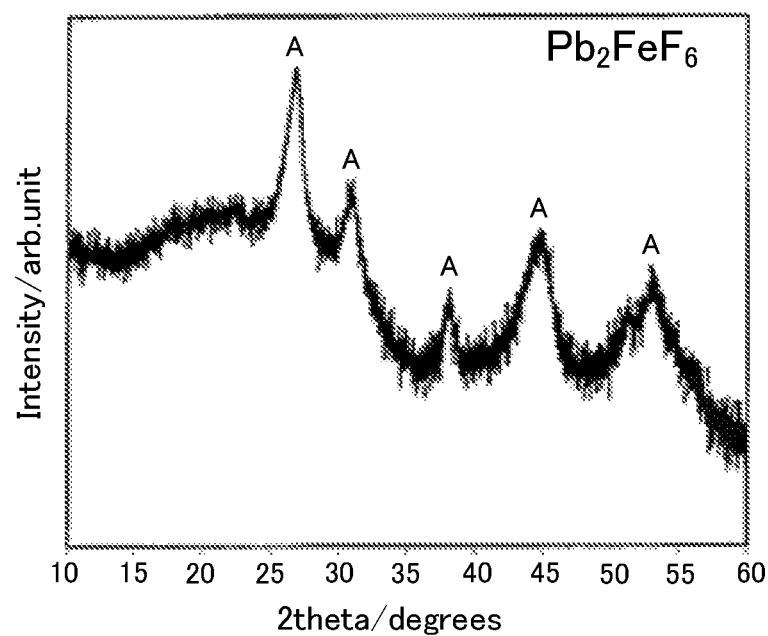
FIG. 3 is the result of an XRD measurement for the cathode active material ($Pb_2FeF_6$) used in Example 2.
Figure 4:
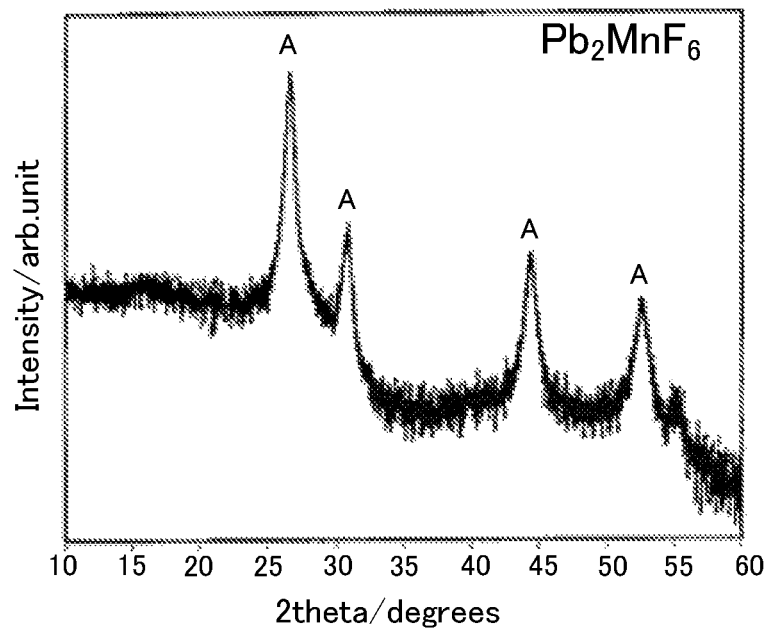
FIG. 4 is the result of an XRD measurement for the cathode active material ($Pb_2MnF_6$) used in Example 3.
Figure 5:
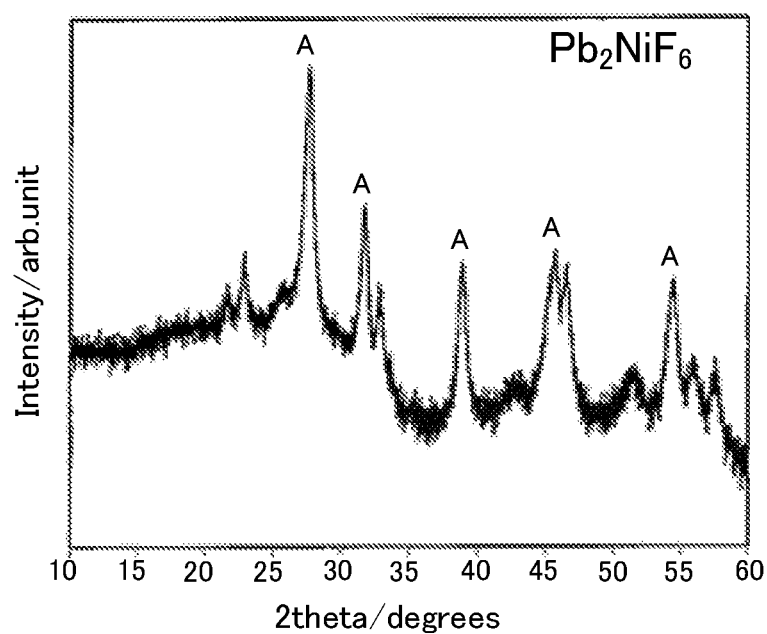
FIG. 5 is the result of an XRD measurement for the cathode active material ($Pb_2NiF_6$) used in Example 4.

An X-ray diffraction measurement (XRD measurement) was conducted to the cathode active materials in Examples 1 to 4. Incidentally, a CuKα ray was used as the source of radiation. The results are shown in FIG. 2 to FIG. 5. As shown in FIG. 2 to FIG. 5, it was confirmed that the cathode active materials in Examples 1 to 4 were respectively a material with a single phase. The peaks of 2θ=27.4°, 31.5°, 38.6°, 45.3°, and 53.8° were examples of the characteristic peaks of $Pb_2CoF_6$ as shown in FIG. 2. The peaks of 2θ=26.8°, 30.9°, 38.2°, 44.8°, and 53.2° were examples of the characteristic peaks of $Pb_2FeF_6$ as shown in FIG. 3. The peaks of 2θ=26.6°, 30.9°, 44.4°, and 52.6° were examples of the characteristic peaks of $Pb_2MnF_6$ as shown in FIG. 4. The peaks of 2θ=27.6°, 31.7°, 38.9°, 45.7°, and 54.4° were examples of the characteristic peaks of $Pb_2NiF_6$ as shown in FIG. 5.

Figure 6:
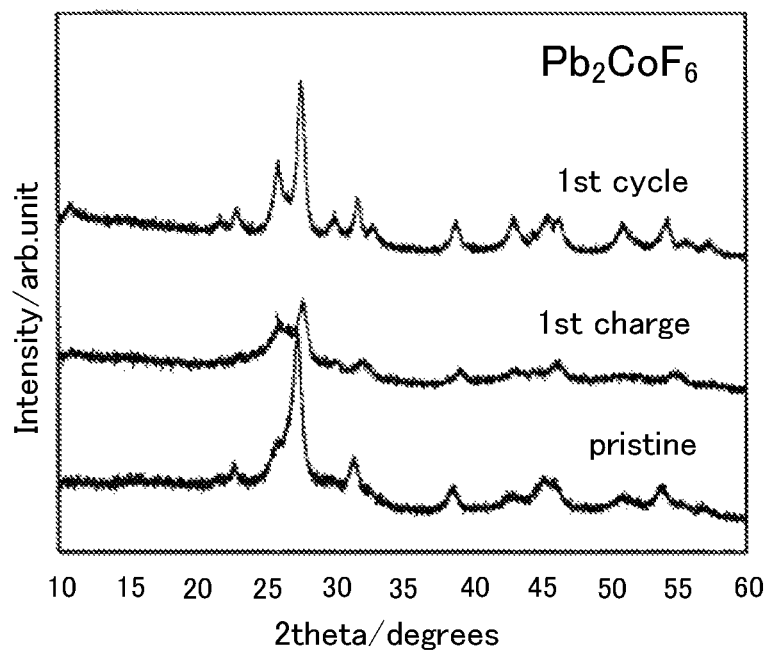
FIG. 6 is the result of an XRD measurement for the cathode active material ($Pb_2CoF_6$) used in Example 1 after the initial charge and the initial discharge.

An XRD measurement was conducted to the cathode active material obtained in Example 1. Also, an XRD measurement was similarly conducted to the cathode active material after the initial charge and after the initial discharge. The results are shown in FIG. 6. As shown in FIG. 6, the crystal peak became smaller after the initial charge (after fluorination). This is presumed to be because the crystal structure was disordered when fluorine was taken into the crystal. On the other hand, after the initial discharge, the crystal peak as large as that before charge and discharge was confirmed. It is presumed that the crystal structure was reversibly changed by defluorination.

CV Measurement and Charge and Discharge Test

Figure 11A:
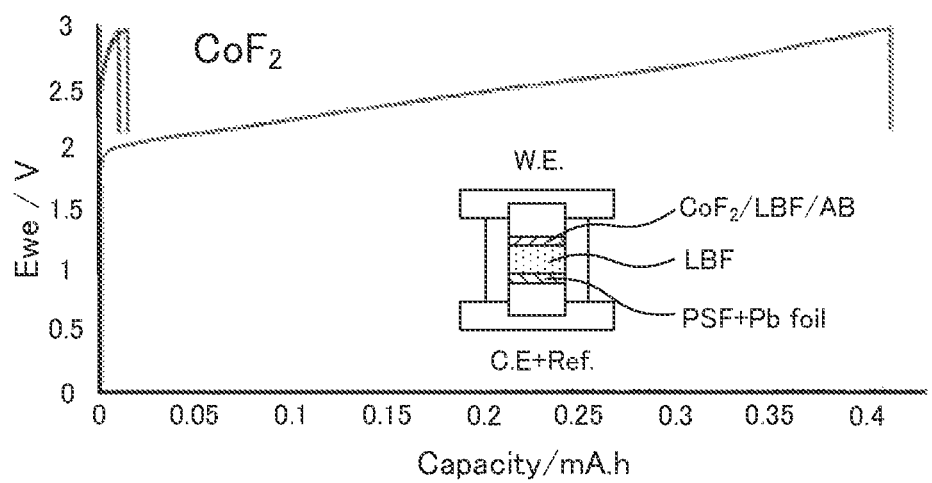
FIGS. 11A and 11B are the result of charge and discharge test for the evaluation battery obtained in Comparative Example 1.
Figure 11B:
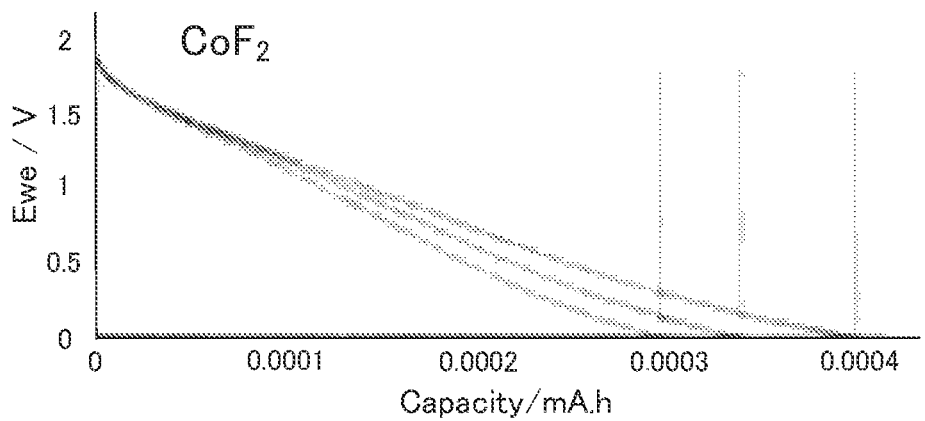

A charge and discharge test in a cell heated at 140° C. was performed for the evaluation batteries obtained in Examples 1 to 4 and Comparative Examples 1 and 2. Current conditions were 50 μA/cm² (charge) and 50 μA/cm² (discharge). The results are shown in FIG. 7 to FIG. 12. Incidentally, FIG. 11A shows a charge curve, and FIG. 11B shows a discharge curve.

Figure 12:
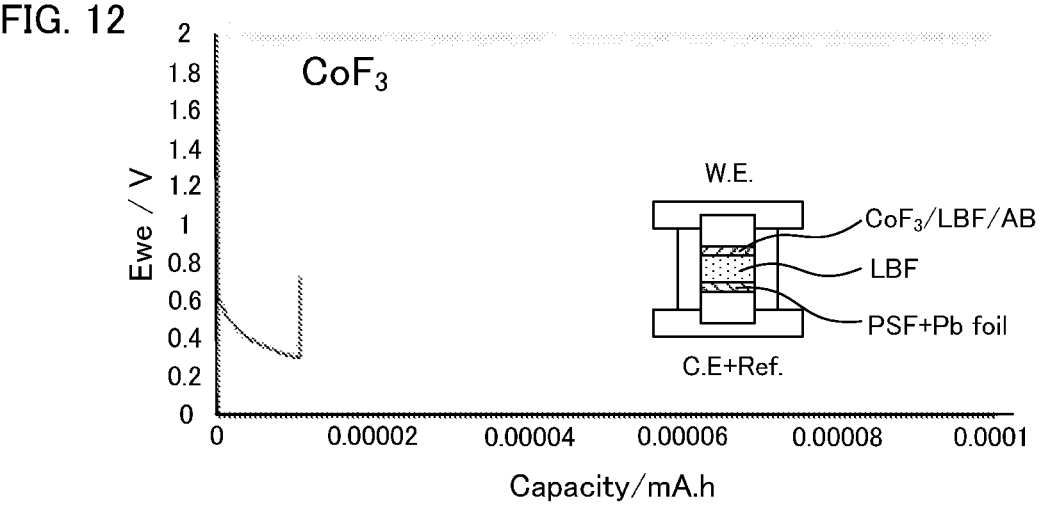
FIG. 12 is the result of a charge and discharge test for the evaluation battery obtained in Comparative Example 2.

As shown in FIG. 7 to FIG. 10, it was confirmed that $Pb_2CoF_6$, $Pb_2FeF_6$, $Pb_2MnF_6$, and $Pb_2NiF_6$ used in Examples 1 to 4 functioned as an active material. In particular, it was confirmed that $Pb_2CoF_6$ used in Example 1 was an active material capable of being charged and discharged at high potential of approximately 2.0 V (vs. $Pb/PbF_2$). Meanwhile, with $CoF_2$ used in Comparative Example 1, although a charge reaction proceeded as shown in FIG. 11A, a discharge reaction did not proceed as shown in FIG. 11B. Also, with $CoF_3$ used in Comparative Example 2, a charge reaction could not proceed first as shown in FIG. 12, since Co was trivalence. In this manner, the charge and discharge reactions derived from $Co^{2+} \leftrightarrow Co^{3+}$ were barely confirmed in $CoF_2$ and $CoF_3$ used in Comparative Examples 1 and 2.

Rate Characteristic Evaluation

Figure 13A:
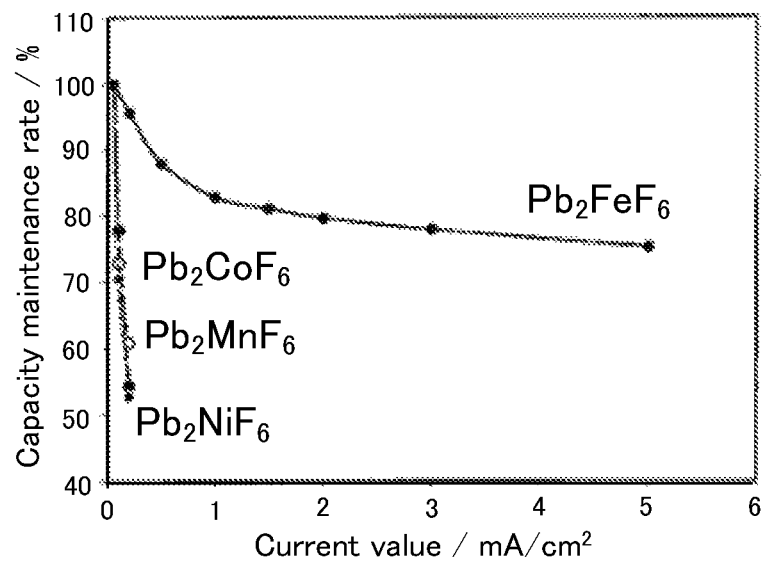
FIGS. 13A and 13B are the results of a rate property evaluation for the evaluation batteries obtained in Examples 1 to 4.
Figure 13B:
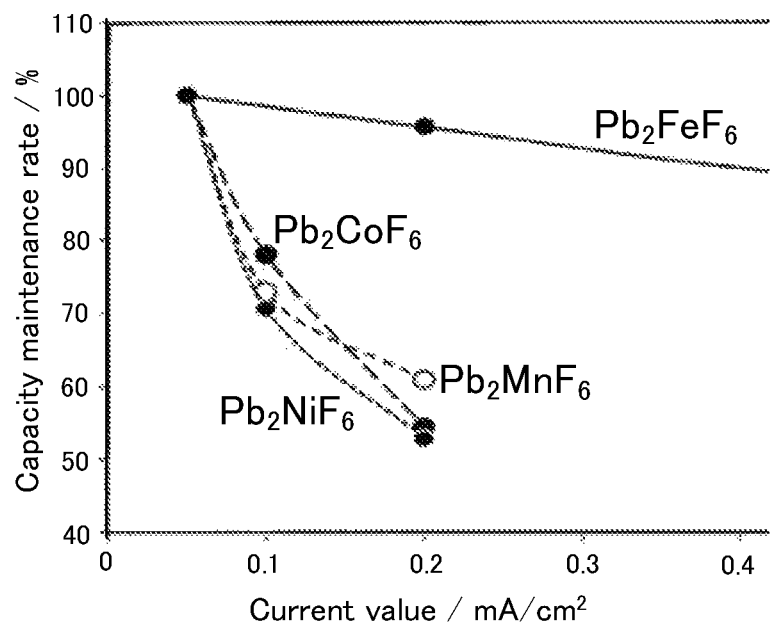

A rate characteristic evaluation was conducted to the evaluation batteries obtained in Examples 1 to 4. In specific, the rate characteristic evaluation was conducted by changing the current density to 0.05 mA/cm², 0.1 mA/cm², 0.2 mA/cm², 0.5 mA/cm², 1 mA/cm², 1.5 mA/cm², 2 mA/cm², 3 mA/cm², and 5 mA/cm². Incidentally, the capacity maintenance rate is a value of discharge capacity in each current value when the discharge capacity in 0.05 mA/cm² is determined as 100%. The results are shown in FIGS. 13A and 13B. Incidentally, FIG. 13B is an enlarged view of FIG. 13A. As shown in FIGS. 13A and 13B, it was confirmed that the capacity maintenance rate with $Pb_2FeF_6$ used in Example 2 remarkably improved compared to $Pb_2CoF_6$, $Pb_2MnF_6$, and $Pb_2NiF_6$ used in Example 1 and Examples 3 and 4. Also, the capacity maintenance rate with $Pb_2FeF_6$ used in Example 2 was higher than that with $Pb_2CoF_6$, $Pb_2MnF_6$, and $Pb_2NiF_6$ used in Example 1 and Examples 3 and 4, and further, degrade of the capacity maintenance rate was small even when the current value was increased; thus, extremely excellent rate characteristic was confirmed. In this manner, significantly excellent effect not conventionally presumable was exhibited.

REFERENCE SIGNS LIST

1 . . . cathode active material layer
2 . . . anode active material layer
3 . . . electrolyte layer
4 . . . cathode current collector
5 . . . anode current collector
6 . . . battery case
10 . . . fluoride ion battery

What is claimed is:

1. A fluoride ion battery comprising:
a cathode active material layer, an anode active material layer, and an electrolyte layer formed between the cathode active material layer and the anode active material layer;
wherein the cathode active material layer contains a cathode active material including a composition represented by $Pb_2MF_6$, in which M is at least one selected from the group consisting of Mn, Fe, Co, and Ni.

2. The fluoride ion battery according to claim 1, wherein the cathode active material comprises a peak at a position of 2θ=27.1°±1.0° and 31.3°±1.0° in an X-ray diffraction measurement using a CuKα-ray.

3. The fluoride ion battery according to claim 1, wherein M is at least Mn.

4. The fluoride ion battery according to claim 1, wherein M is at least Fe.

5. The fluoride ion battery according to claim 1, wherein M is at least Co.

6. The fluoride ion battery according to claim 1, wherein M is at least Ni.

* * * * *